(12) United States Patent
Topol

(10) Patent No.: US 11,361,163 B2
(45) Date of Patent: Jun. 14, 2022

(54) SYSTEM AND METHOD TO REPRESENT CONVERSATIONAL FLOWS AS GRAPH EMBEDDINGS AND TO CONDUCT CLASSIFICATION AND CLUSTERING BASED ON SUCH EMBEDDINGS

(71) Applicant: MuyVentive, LLC, West Hartford, CT (US)

(72) Inventor: Zvi Topol, West Hartford, CT (US)

(73) Assignee: MUYVENTIVE, LLC, West Hartford, CT (US)

( * ) Notice: Subject to any disclaimer, the term of this patent is extended or adjusted under 35 U.S.C. 154(b) by 231 days.

(21) Appl. No.: 16/697,940

(22) Filed: Nov. 27, 2019

(65) Prior Publication Data
US 2020/0193094 A1 Jun. 18, 2020

Related U.S. Application Data

(60) Provisional application No. 62/780,789, filed on Dec. 17, 2018.

(51) Int. Cl.
*G06F 40/30* (2020.01)
*G06T 11/20* (2006.01)
*G10L 13/00* (2006.01)

(52) U.S. Cl.
CPC ............ *G06F 40/30* (2020.01); *G06T 11/206* (2013.01); *G10L 13/00* (2013.01)

(58) Field of Classification Search
CPC ......... G06F 40/30; G06T 11/206; G10L 13/00
See application file for complete search history.

(56) References Cited

U.S. PATENT DOCUMENTS

| 6,404,438 B1* | 6/2002 | Hatlelid | G06F 3/033 345/473 |
| 2018/0032874 A1* | 2/2018 | Sanchez | G06F 16/367 |
| 2018/0129408 A1* | 5/2018 | Aradilla | G06F 40/274 |
| 2018/0366114 A1* | 12/2018 | Anbazhagan | G06F 9/4451 |

(Continued)

OTHER PUBLICATIONS

Topol (Dec. 2018) "Gain Insight from Conversations Using Process Mining with LUIS," Cognitive Services, vol. 33, No. 12, 12 pp.

(Continued)

*Primary Examiner* — Seth A Silverman
(74) *Attorney, Agent, or Firm* — Lathrop GPM LLP

(57) ABSTRACT

Systems and methods develop a natural language interface. Conversational data including user utterances is received for a plurality of conversations from a natural language interface. Each of the conversations is classified to determine intents for each user utterance, and for each of the conversations, a control flow diagram showing the intents and sequential flow of the conversation is generated. Each of the control flow diagrams is processed to generate a graph embedding representative of the conversation. A previous conversation that is similar to the current conversation is identified from a previous graph embedding that is nearest to a current graph embedding of a most recent utterance in a current conversation. A previous outcome of the previous conversation is used to predict an outcome of the current conversation, which, when not positive, may control response outputs of the natural language interface to steer the current conversation towards a positive result.

12 Claims, 7 Drawing Sheets

(56) References Cited

U.S. PATENT DOCUMENTS

| | | | |
|---|---|---|---|
| 2019/0057143 A1* | 2/2019 | Porter | G06Q 10/10 |
| 2019/0228107 A1* | 7/2019 | Trim | H04L 51/02 |
| 2020/0234700 A1* | 7/2020 | Heltewig | G06F 40/205 |

OTHER PUBLICATIONS

Topol (Jul. 2018) "Improving LUIS Intent Classifications," Cognitive Services, vol. 33, No. 7, 13 pp.

Narayanan et al. (Jul. 17, 2017) "graph2vec: Learning Distributed Representations of Graphs," arXiv:1707.05005v1 [cs.AI] Jul. 17, 2017, 8 pp. [Available online at: https://arxiv.orgh/abs/1707.05005].

Godec (Dec. 31, 2018) "Graph Embeddings—The Summary," Towards Data Science, 10 pp. [Available online at: https://towardsdatascience.com/graph-embeddings-the-summary-cc6075aba007].

Bose et al. (Sep. 2010) "Trace Alignment in Process Mining: Opportunities for Process Diagnostics," BPM 2010, LNCS 6336, pp. 227-242.

\* cited by examiner

200

| | 202 | 204 | 206 |
|---|---|---|---|
| | TIMESTAMP | CONV ID | UTTERANCE |
| | 2019-11-01 11:03:23 | 11 | Hi, I was interested to to get a quote for a car insurance policy |
| | 2019-11-01 11:03:24 | 11 | No, I am not an existing customer |
| | 2019-11-01 11:03:27 | 11 | I live in Los Angeles, California |
| | 2019-11-01 11:03:30 | 11 | Yes, I would be interested in a collision coverage |
| | 2019-11-01 11:03:32 | 11 | Please send me the quote to A@A.com |
| | 2019-11-01 11:03:35 | 11 | Thank you very much, good bye! |

| 202 | 204 | 206 | 330 |
|---|---|---|---|
| TIMESTAMP | CONV ID | UTTERANCE | INTENT |
| 2019-11-01 11:03:23 | 11 | Hi, I was interested to to get a quote for a car insurance policy | EXPLORATIONINTENT |
| 2019-11-01 11:03:24 | 11 | No, I am not an existing customer | ACCOUNTINTORMINTENT |
| 2019-11-01 11:03:27 | 11 | I live in Los Angeles, California | LOCATIONINFORMINTENT |
| 2019-11-01 11:03:30 | 11 | Yes, I would be interested in a collision coverage | COVERAGEINFOINTENT |
| 2019-11-01 11:03:32 | 11 | Please send me the quote to A@A.com | CONTACTINFOINTENT |
| 2019-11-01 11:03:35 | 11 | Thank you very much, good bye! | ENDCONVERSATIONINTENT |

*FIG. 4*

SYSTEM AND METHOD TO REPRESENT CONVERSATIONAL FLOWS AS GRAPH EMBEDDINGS AND TO CONDUCT CLASSIFICATION AND CLUSTERING BASED ON SUCH EMBEDDINGS

RELATED APPLICATIONS

This application claims priority to U.S. Patent Application Ser. No. 62/780,789, titled "System and Method to Represent and Classify Conversational Flows Using Process Mining", filed Dec. 17, 2018, and incorporated herein by reference.

BACKGROUND

This invention relates to conversational data generated by interacting with natural language interfaces such as voice interfaces and chatbots. A designer of the natural language interface cannot easily determine how well a natural language interface will handle a conversation.

SUMMARY

One aspect of the present embodiments includes the realization that there is a nascent but growing space called conversational analytics with a need for tools that facilitate development of natural language interfaces. The present embodiments solve this problem by providing a conversational analytics toolset that generates reports of summary statistics of popular intents and entities appearing in conversational transcripts and control flow diagrams that are generates to describe the conversations in a graphical representation. Advantageously, the conversational analytics toolset processes conversational data and generates summary statistics reports and graphical representations that allow the developer to see problems with the intents used by the natural language interface and learn how to adjust the intents to improve the quality of the natural language interface.

Another aspect of the present embodiments includes the realization that a natural language interface could steer a current conversation towards a positive outcome if it knew that the current conversation was likely to have a negative outcome. The present embodiments solve this problem by using graph embedding to identify a previous conversation that is similar to the current conversation and then determining whether that previous conversation had a negative outcome. When the previous conversation had a negative outcome, the natural language interface may be controlled to steer the current conversation towards a more positive outcome.

In one embodiment, a method develops natural language interface. Conversational data including user utterances is received for a plurality of conversations from a natural language interface. Each of the conversations is classified to determine one or more intents for each of the user utterances, and, for each of the conversations, a control flow diagram showing the intents and sequential flow of the conversation is generated. Each of the control flow diagrams is processed to generate a graph embedding representative of the conversation.

In another embodiment, a method directs a current conversation with a natural language interface. A most recent utterance from a user in the current conversation is received and classified to determine an intent of the user. A current control flow diagram of the current conversation is generated and a current graph embedding is generated for the current control flow diagram. At least one previous graph embedding, nearest to the current graph embedding, is selected and corresponds to at least one previous conversation. A previous outcome of the at least one previous conversation is determined and a predicted outcome of the current conversation is determined based upon the previous outcome. When the predicted outcome is not positive, response outputs of the natural language interface for the current conversation are steered based upon the predicted outcome.

In another embodiment, a software product, has instructions, stored on computer-readable media, wherein the instructions, when executed by a computer, perform steps for natural language interface development. The software product includes instructions for receiving, from a natural language interface and for a plurality of conversations, conversational data including user utterances; instructions for classifying each of the conversations to determine intents for each of the user utterances; instructions for generating, for each of the conversations, a control flow diagram showing the intents and sequential flow of the conversation; and instructions for processing each of the control flow diagrams to generate a graph embedding representative of the conversation

BRIEF DESCRIPTION OF THE FIGURES

FIG. 2 is a table showing example conversational data captured by the natural language interface of FIG. 1;

FIG. 4 is a table showing conversational data, which is based upon the conversational data of FIG. 2, and further includes intent determined by the natural language analyzer of FIG. 3, in embodiments;

DETAILED DESCRIPTION OF THE EMBODIMENTS

Conversational data may be formed from transcripts of a conversation between a user and another entity (e.g., another person or an artificial intelligence interface). The conversational data may include at least one utterance by the user (e.g., a textual transcript of what the user said), a conversation ID that identifies, in a unique way, a conversation that the utterance is part of, a user ID that identifies, in a unique way, the user having the conversation, and a timestamp that defines when the user utterance occurred. A natural language interface may be built to allow the user to communicate (verbally or textually) with a machine, for example. However, for the machine to understand the conversation, the conversational data is analyzed to derive meaning from the user's utterances. Developing the natural language interface is complex and often required insight from the developer. The embodiments described herein provide tools and analysis for developing the natural language interface to better understand the conversational data.

Natural Language Interfaces

Figure 1:
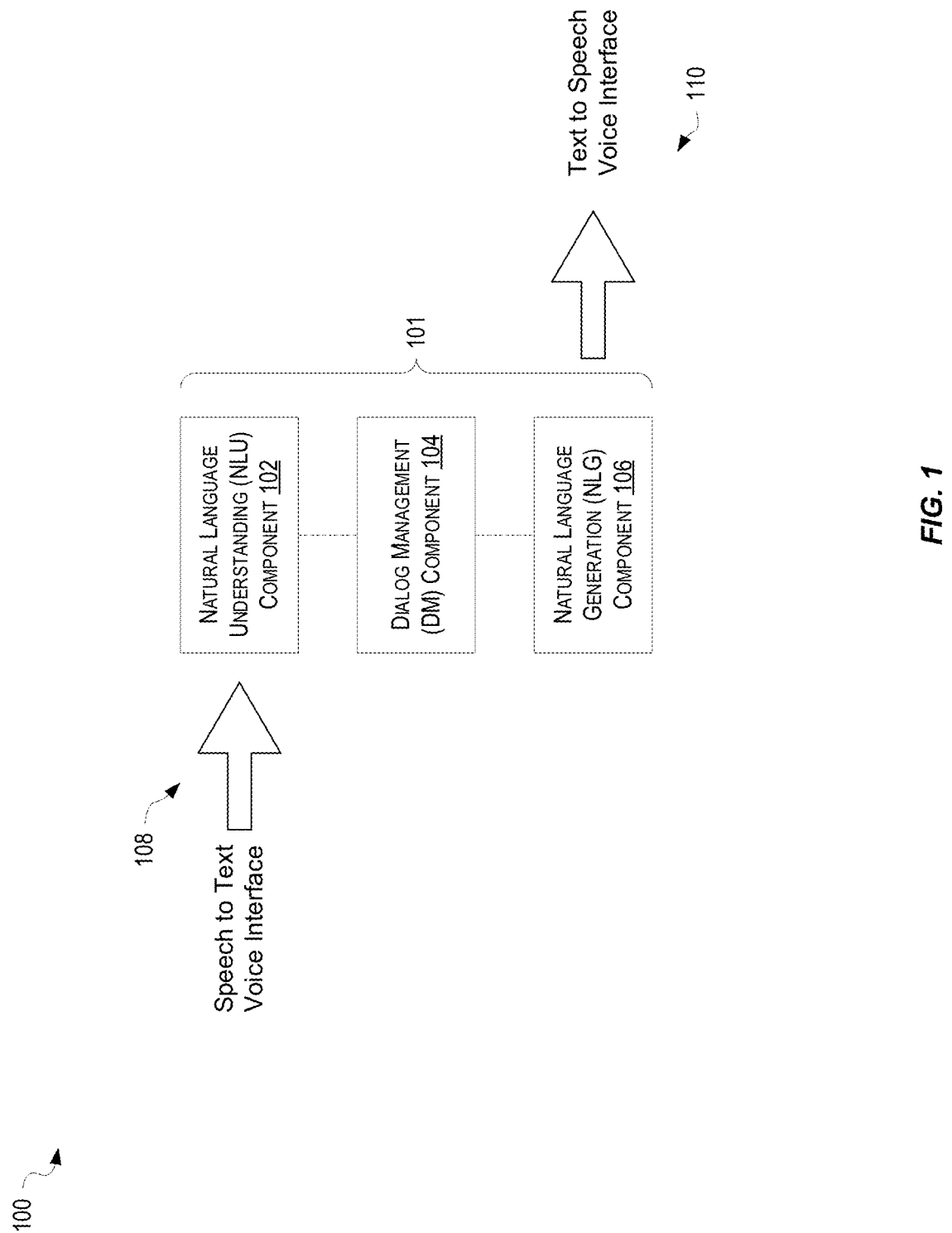
FIG. 1 is a high-level view of a natural language interface, in an embodiment.

FIG. 1 is a high-level view of a natural language interface 100 formed as a three-component stack 101. Natural language interface 100 may represent a voice interface, such as Google Home, and Siri, and may also represent a chatbot (e.g., where the user interacts through a web interface). Three-component stack 101 includes a Natural Language Understanding (NLU) component 102, a dialog management (DM) component 104, and a Natural Language Generation (NLG) component 106. A user utterance 108 is input to NLU 102 as a textual transcript of what a user types and/or says. A natural language textual response 110 is determined by DM component 104 and output by NLG component 106, such as by transforming it into speech for voice interfaces.

NLU component 102 receives the user utterance as an input. Less recent implementations of this component used rule-based methodologies, such as keyword matching, to determine the user meaning, and thus the user intent. More recent implementations of NLU component 102 may include Rasa, Lex (Amazon), LUIS (Microsoft), Watson Conversation (IBM), and DialogFlow (Google), that use supervised machine learning algorithms to determine the user intent, and may also determine entities that are representations of real-world objects. In one example of use, a bank implements natural language interface 100 as an initial customer contact point (e.g., as online chat or as an automated telephone interface). A user may interact with natural language interface 100 as if conversing with a person. For example, a user utterance of "What is the balance in my checking account?" should be classified as (e.g., determined as having intent of) "PersonalAccountsIntent," with identified entities of "balance" and "checking account." NLU component 102 may also provide a confidence score that allows the determined intents (and/or the determined entities) for the utterance to be ranked according to confidence of the classification. In one embodiment, NLU component 102 may select the highest ranked intent and entities, along with their confidence scores, for the utterance. In another embodiment, NLU component 102 may provide a list of possible intents, each with a corresponding ranking. In certain embodiments, NLU component 102 may include additional functionality, such as sentiment analysis and language identification.

NLG component 106 receives information for output from DM component 104 (and/or other possible outputs feeds) and selects a right type of response to return to the user. The selected response may also include an action, such that the response includes any necessary data. Continuing with the example above, the response may include an action of inform_account_info with data being a balance of the user's account (when the user has an account with the bank).

Certain, less recent, implementations of NLG component 106 use only rule-based state transition systems, where the states encode user utterances, intents, and other types of information required by the DM system, e.g. demographic information of users. Certain, more recent, implementations of NLG component 106 use machine-learning algorithms, including Reinforcement Learning algorithms, and/or supervised machine learning for best next action prediction.

Where the response includes an action, NLG component 106 outputs the actual natural language that will be returned to the user. Continuing with the above example, in response to the inform_account_info action, NLG component 106 may generate a natural language text that include the additional data indicative of the balance of the user's account, such as "Your balance is X."

Conversational Analytics

Figure 3:
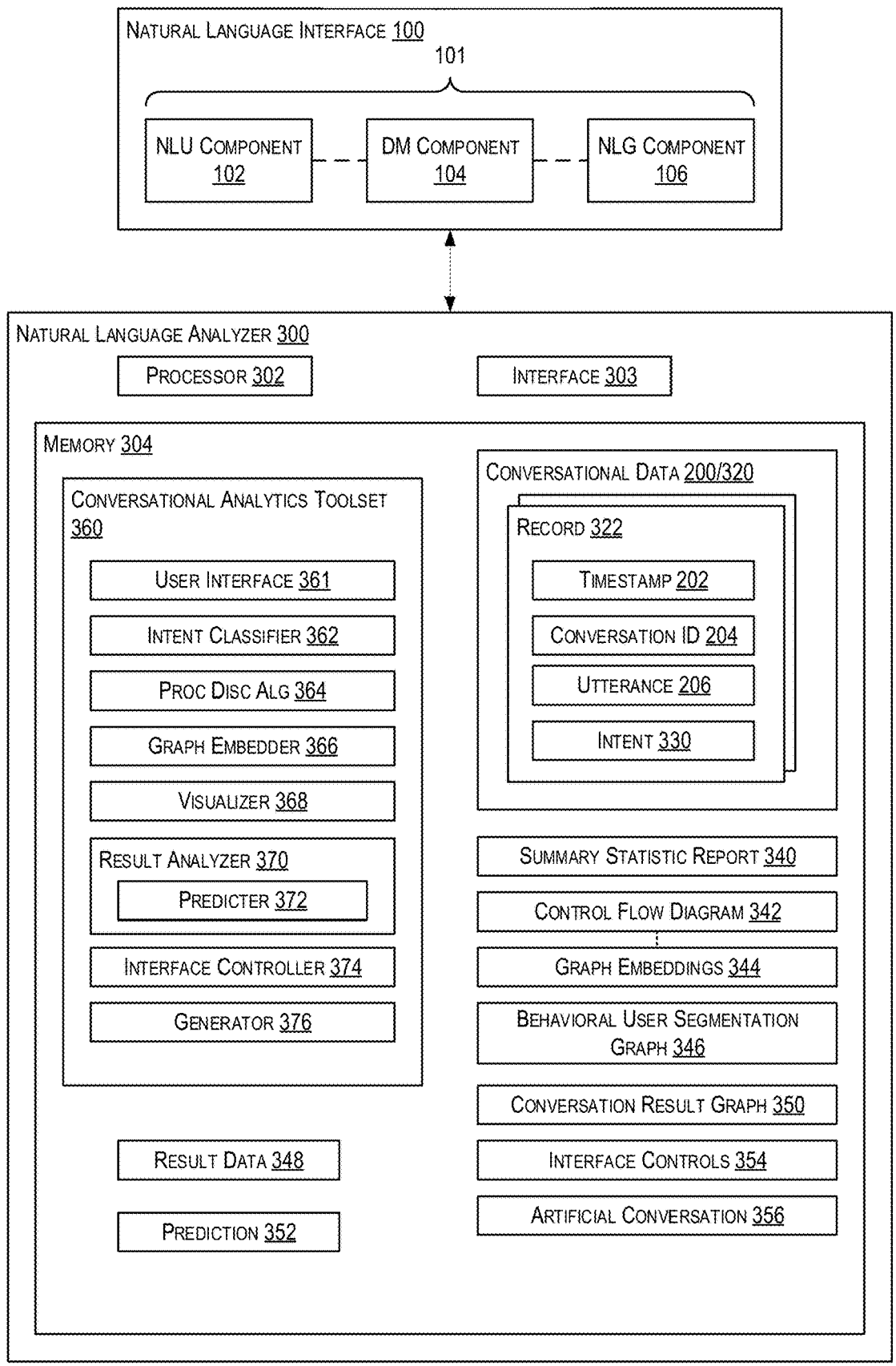
FIG. 3 is a schematic illustrating one example natural language analyzer for representing conversational flows as graph embeddings, and for conducting classification and clustering based on such embeddings, in embodiments.
Figure 5:
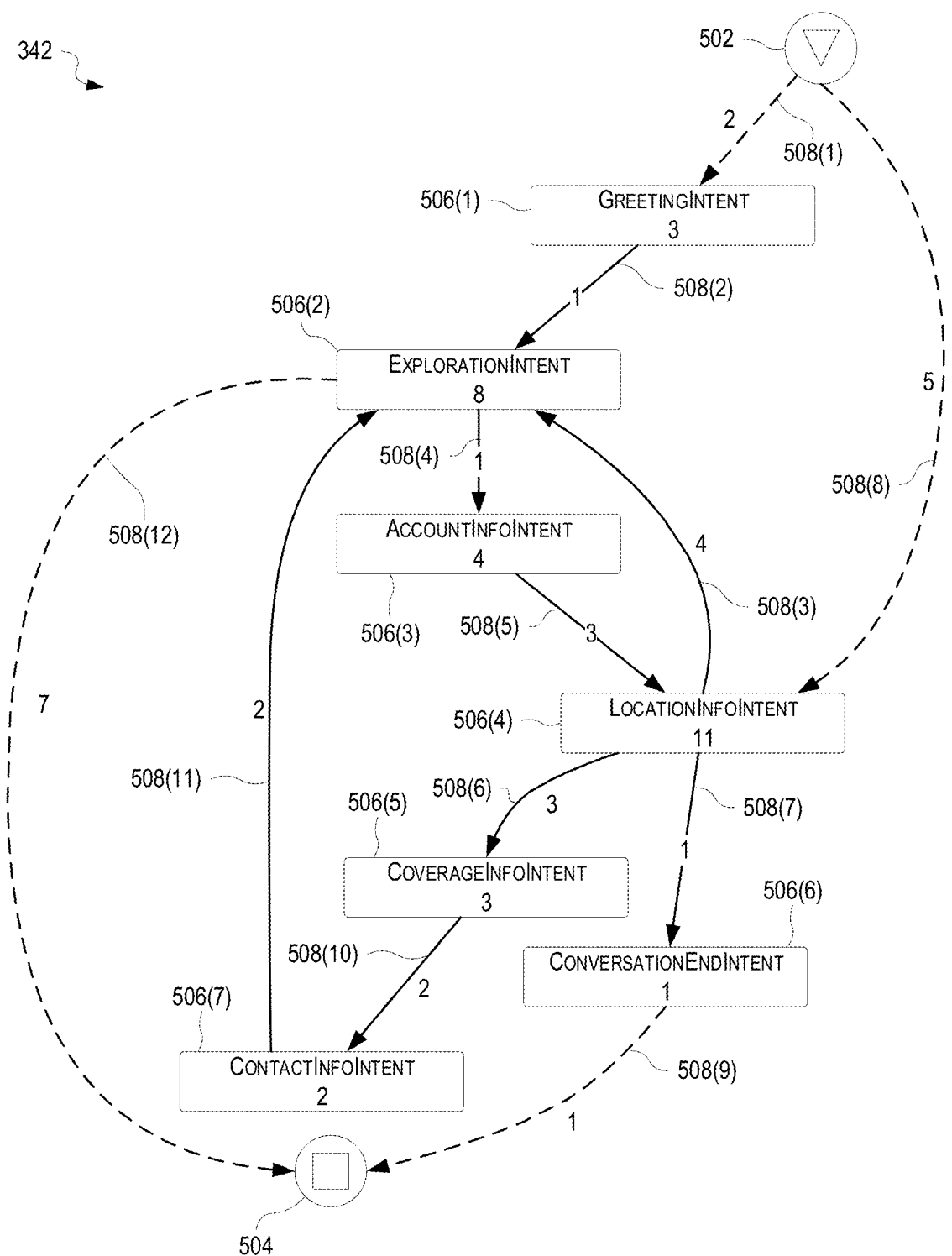
FIG. 5 graphically shows one example control flow diagram of FIG. 3, in embodiments.

FIG. 2 is a table showing example conversational data 200 captured by the natural language interface 100 of FIG. 1. FIG. 3 is schematic illustrating one example natural language analyzer 300 for representing conversational flows as control flow diagrams 342 with graph embeddings 344, and for conducting classification and clustering based on the graph embeddings 344. One example control flow diagram 342 is shown in FIG. 5. Natural language analyzer 300 is for example implemented by one or more digital computers that include at least one processor 302 communicatively coupled with memory 304. FIG. 4 is a table showing conversational data 320 that is based upon conversational data 200 of FIG. 2, and that further includes intent 330 determined by the natural language analyzer of FIG. 3. In the example of FIGS. 2 and 4, ExplorationIntent is an intent about what type of insurance the customer is interested in; AccountInformIntent is an intent determining whether the customer is an existing or new customer; LocationInformIntent is an intent determining the location of residence of the customer; CoverageInformIntent is an intent determining the coverage the customer is interested in; ContactInfoIntent is an intent for when the customer provides their contact information; and EndConversationIntent is an intent reflecting that the customer is ending the conversation. FIGS. 2, 3, 4 and 5 are best viewed together with the following description.

A developer may design and develop natural language interface 100 in an iterative manner, where a standard configuration of components 102, 104, 106 is initially deployed and then at least one of components 102, 104, 106 is then refined by reviewing conversational data from transcripts of at least one user interacting with natural language interface 100, along with other available data on the at least one user, such as corresponding demographic information etc.

Natural language analyzer 300 may include an interface 303 for communicating with, configuring, and controlling, natural language interface 100. For example, interface 303 may receive conversational data 200 from natural language interface 100, and control one or more of NLU component 102, DM component 104, and NLG component 106 to steer conversations between the user and the entity.

A conversational analytics toolset 360, stored in memory 304, is for example software that includes machine-readable instructions that, when executed by processor 302, control processor 302 to provide functionality of natural language analyzer 300 as described herein. Conversational analytics toolset 360 includes a user interface 361 that allows a developer of natural language interface 100 to interactively use functionality of conversational analytics toolset 360 to analyze how conversations (e.g., stored as conversational data 200/320) are handled by natural language interface 100, identify gaps in the natural language processing, and learn how natural language interface 100 may be improved. Particularly, conversational analytics toolset 360 provides the developer with insight into how well natural language interface 100 is working by analyzing entire conversations and providing better understanding of why certain conversations succeed while others fail.

Conversational analytics toolset 360 includes an intent classifier 362, a process discovery algorithm 364, a graph embedder 366, a visualizer 368, a result analyzer 370 with a predicter 372, and an interface controller 374. Toolset 360 may be invoked to process conversational data 200 and generate one or more of conversational data 320 with intent 330, a summary statistics report 340, a control flow diagram 342 with graph embeddings 344, a behavioral user segmentation graph 346, a conversation result graph 350, and a prediction 352.

Toolset 360 analyzes results of conversations to make predictions 352 of outcomes of real-time conversations, and may generate interface controls 354 that may be sent to natural language interface 100 to steer conversations towards a desired outcome. That is, toolset 360 may control natural language interface 100 to steer conversations towards more positive results, thereby improving the quality of natural language interface 100.

Toolset 360 invokes intent classifier 362 to process utterances 206 of conversational data 200, received via interface 303 from natural language interface 100, and generate conversational data 320 that includes a plurality of records 322, each having timestamp 202, conversation ID 204, utterance 206 and intent 330.

Toolset 360 invokes process discovery algorithm 364 to process conversational data 320 and generate control flow diagram 342 to represent an entire conversation. Examples of process discovery algorithm 364 may include: fuzzy miner, inductive miner, heuristic miner, alpha miner, and a selected combination thereof. Control flow diagram 342 is a directed graph (e.g., G=(V,E)) and may be called a process map or a directly-follows-graph (DFG) in the art of process mining. In FIG. 5, intents 506 are indicated by rectangular nodes and circular vertices 502 and 504 represent start and end points, respectively, of conversations. The number appearing within each intent 506 indicates how many times that intent appears in conversational data 320. The directed edges 508 (E) connect a source intent 506 with a target intent 506 to model a sequential flow of the conversation. For example, directed edge 508(2) connects source intent 506(1) to target intent 506(2). Accordingly, target intent 506(2) directly follows source intent 506(1) in the conversational flow of conversational data 320.

Toolset 360 invokes graph embedder 366 to transform control flow diagram 342 into a vector of 'n' dimensions, referred to as graph embedding 344. Graph embedder 366 captures fundamental properties of control flow diagram 342, including topology, relationships between nodes or group of nodes, and so on, and thereby defines an entire conversation as a single vector. Prior art comparisons were limited to utterances or phrases. Accordingly, graph embeddings 344 of many different conversations may be efficiently stored and may be evaluated to determine whether conversations are similar or different. That is, an angle between two, or more, vectors of graph embeddings 344 indicates closeness of the conversations defined by those graph embeddings 344 (and corresponding control flow diagrams 342). Specifically, each graph embeddings 344 represents a conversation, and graph embeddings 344 may be compared, using conversational analytics toolset 360, to identify (e.g., by closeness of vectors in an n-dimensional space) a previous conversation that is similar to a current conversation for example.

Dimensionality of vectors is typically determined empirically between 50 and 150, based on how well distances between vectors capture similarities between graphs. Graph Kernels, which may also be used to determine similarity between graphs, is similar to graph embedding, but are manually crafted. Both graph kernels and graph embeddings may be used by conversational analytics toolset 360, however, embodiments and examples described herein focus on graph embeddings. Graph embedder 366 maps similar graphs to vectors that are closer in space (e.g., the angle between vectors of similar graphs is smaller compared to the angle between vectors of less similar graphs). Advantageously, vectors representing process maps may be used as features for classification algorithms and/or for clustering algorithms, and therefore, as described in more detail below, graph embeddings 344 may also be used for classification and clustering. Vectors defined by graph embeddings 344 significantly improve performance of subsequent analysis of conversational data 320.

As noted above, control flow diagram 342 is an attributed directed graph, where the attributes define additional data in both the nodes and the edges of the graph, and where a direction of each edge between two nodes is important (e.g., edges are directed). In the example of FIG. 5, the number in each node indicates how many times that intent appears in different conversations and the number on each edge (between intents) indicates how many time a transition between that specific ordered pair of intents occurs in conversations. Each node and/or edge may store additional information without departing from the scope hereof. In certain embodiments, graph embedder 366 may capture this additional information (in addition to the topological structure of the graph) in graph embeddings 344 to improve accuracy of the vectors representing the graph and thereby allow similarity in conversations to be determined more accurately between two different control flow diagrams 342.

Figure 6:
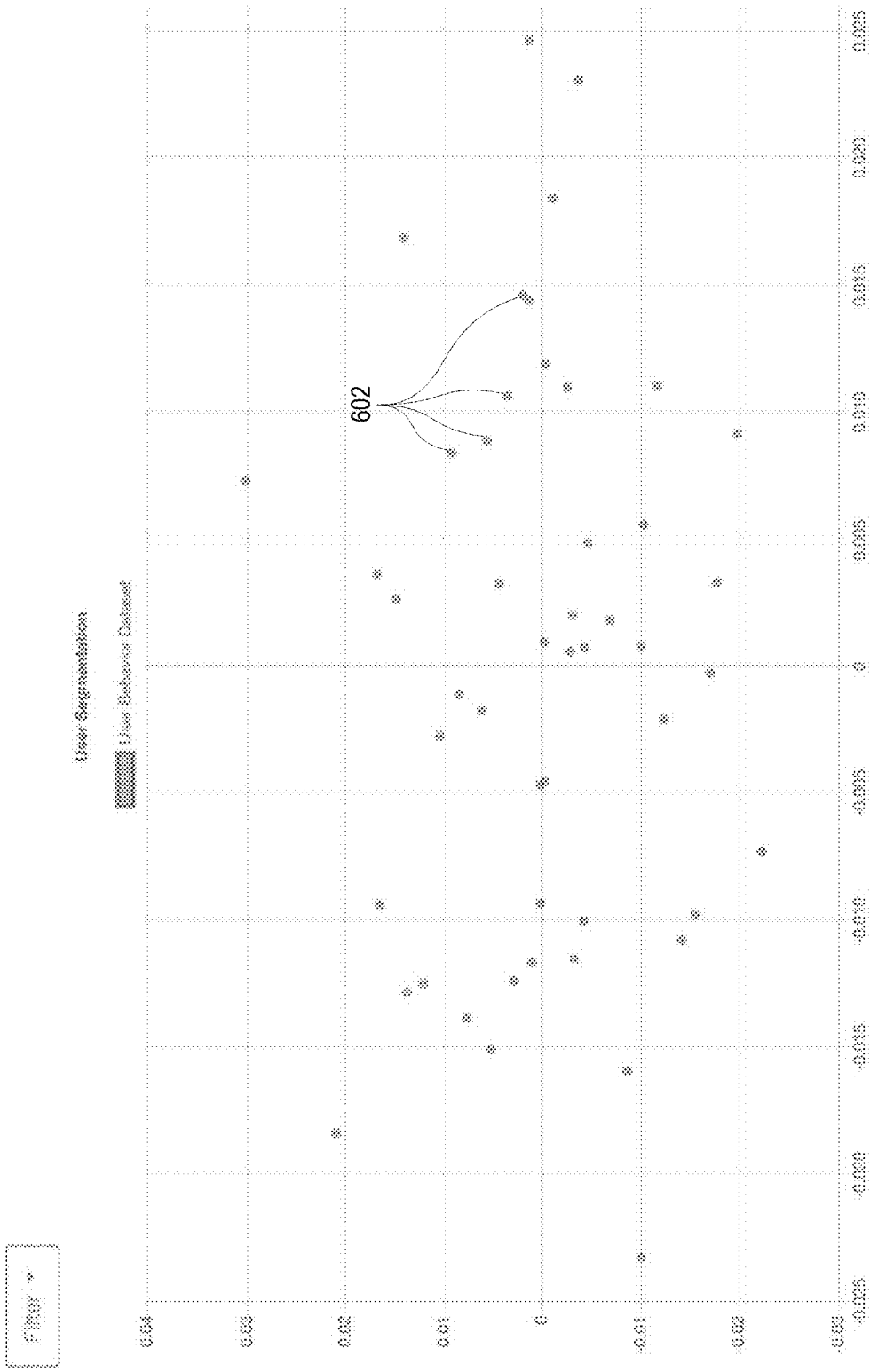
FIG. 6 shows one example behavioral user segmentation graph, in an embodiment.

Toolset 360 may invoke visualizer 368 to generate behavioral user segmentation graph 346 that visually illustrates comparisons of a plurality of graph embeddings 344, each representative of intent within a different conversation. FIG. 6 shows one example behavioral user segmentation graph 346 generated by visualizer 368 based upon graph embeddings 344 of multiple users. Each dot 602 in behavioral user segmentation graph 346 represents an interaction a user has had with natural language interface 100 and is based upon the corresponding graph embeddings 344. That is, each dot 602 has a corresponding control flow diagram 342 with graph embeddings 344 defining a n-dimensional vector. A dimensionality reduction technique (e.g., PCA) is then used to reduce the number of dimensions from n to 2, such that the vectors of graph embeddings 344 may be visualized (as shown in FIG. 6). Dots 602 that appear close to one another in behavioral user segmentation graph 346 represent conversations of users that are similar. Advantageously, behavioral user segmentation graph 346 provides rapid assimilation of how well natural language interface 100 is operating and how well conversational data 320 is being evaluated.

Through use of toolset 360, a designer of natural language interface 100 may easily discern where gaps occur during evaluation of the conversational data. The designer of natural language interface 100 may wish to learn of intents 330 that are too generic, and thus where intent classifier 362 may be improved by breaking the one or more generic intents into additional intents that better define the conversation. For example, the natural language interface designer wishes to identify when the user is interested to learn more about different types of insurance policies, and creates the ExplorationIntent 506(2) of FIG. 5 to identify such user interests. However, after observing certain utterances 206 identified as having ExplorationIntent 506(2), the designer realizes that the users ask more specific questions about insurance policies, for example by asking questions about automobile insurance policies such as collision vs. liability coverage. For example, by clicking on one dot 602 in behavioral user segmentation graph 346, user interface 361 may display a user interface artifact (e.g., a pop-up window) showing control flow diagram 342 of that conversation (e.g., as shown in FIG. 5), and may also display corresponding transcriptions as well transcripts. Accordingly, the designer realizes that the ExplorationIntent may be refined and broken into additional intents, for example refine ExplorationIntent by creating the intents AutomobilePolicyExplorationIntent and HomePolicyExplorationIntent, and by using conversational analytic toolset 360, the designer may define these additional intents and may provide corresponding training data for them may be collected from interactions of users with the conversational interface, that asked the more specific questions. Specifically, conversational analytic toolset 360 reveals user conversations and utterances that are similar to an identified user conversation or utterance, thereby allowing the design to easily view transcripts of these revealed conversations and utterances to learn how new intents may be added to help characterize the utterance in greater detail. Conversational analytic toolset 360 also allows more accurate data to be collected for training intent classifier 362. The improved conversational interface may then be tested on the identified conversations where the gap occurred or is likely to occur.

Toolset 360 may invoke result analyzer 370 to evaluate conversational data 320 and graph embeddings 344 in view of result data 348 and to generate a conversational result graph 350. Advantageously, each conversation is represented by an n-dimensional vector and may be easily stored. Result data 348 may represent an outcome (e.g., positive or negative outcome) of a conversation (e.g., between a consumer and a sales person) defined by each conversational data 320. For example, result data 348 may be generated by other systems or devices (e.g., a retail system), not shown, that correlate conversational data 320 with sales data of a website. Result analyzer 370 may implement a supervised machine learning algorithm (e.g., one or both of SVM and Random Forest) that receive graph embeddings 344 and result data 348 as inputs and generates conversational results graph 350 to indicate which conversations resulted in sales and which conversations did not result in sales. By storing outcomes of the conversations (e.g., whether or not the conversation with the user resulted in sale a new mortgage, or not) with the conversation vector, the corresponding conversations may be quickly evaluated to determine which resulted in a positive outcome and which resulted in a negative outcome. This allows the designer of natural language interface 100 to further refine the intents 330 used by intent classifier 362 to improve outcome of the conversations.

Figure 7:
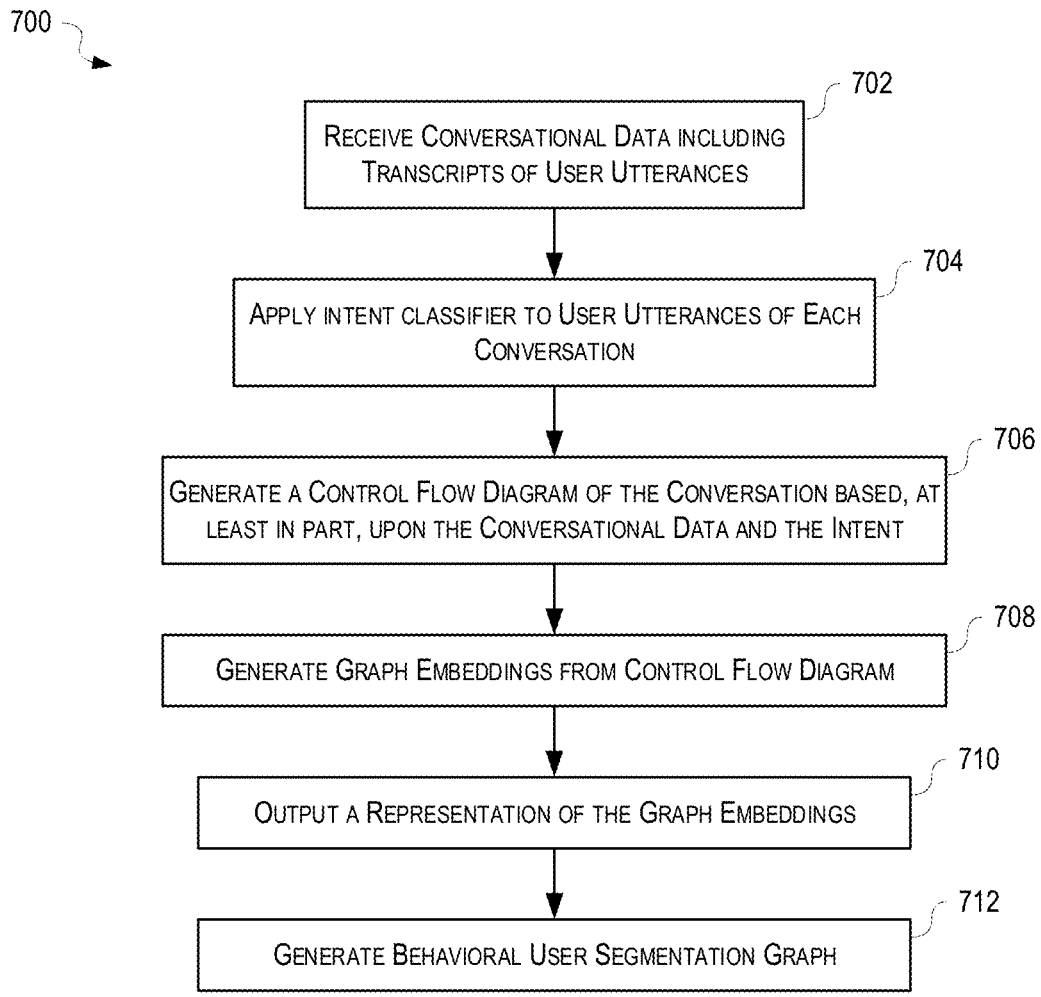
FIG. 7 is a flowchart showing one example method for representing conversational flows as graph embeddings, and to conduct classification and clustering based on such embeddings, in an embodiment.

Graph embedding stores properties of a graph as a vector or a set of vectors, such that these properties may be used in further processing. For example, embedding may capture the graph topology, vertex-to-vertex relationships, and other relevant information of the graph, subgraphs, and vertices. FIG. 7 shows one example method 700 for representing conversational flows as graph embeddings, and to conduct classification and clustering based on such embeddings. Method 700 is, for example, implemented in conversational analytics toolset 360 of natural language analyzer 300 of FIG. 3. A developer may use method 700 to implement, develop, and enhance natural language interface 100, FIG. 1, for use as a first customer contact point of an insurance company, for example.

In block 702, method 700 receives conversational transcripts. In one example of block 702, conversational analytics toolset 360 receives timestamps 202, conversation IDs 204, and utterances 206 from natural language interface 100 to form conversational data 320 within memory 304. In block 704, method 700 applies an intent classifier to the user utterance field of the conversational data to detect intent of each utterance. In one example of block 704, conversational analytics toolset 360 invokes intent classifier 362 to process utterance 206 of each record 322 of conversational data 320 to generate corresponding intent 330. In certain embodiments, block 704 may be omitted when intent classification is performed by an external process (e.g., as part of natural language interface 100).

In block 706, method 700 generates a control flow diagram of the conversation based upon the conversational data and the intent. In one example of block 706, conversational analytics toolset 360 invokes process discovery algorithm 364 to process timestamp 202, conversation ID 204, and intent 330 of each record 322 of conversational data 320 for a particular user to generate a control flow diagram 342 of the conversation.

In block 708, method 700 generates graph embeddings from the control flow diagram. In one example of block 708, conversational analytics toolset 360 invokes graph embedder 366 to generate graph embedding 344 from control flow diagram 342.

Block 712 is optional. If included, in block 712, method 700 generates a behavioral user segmentation graph containing the embedded graph generated in block 710. In one example of block 712, conversational analytics toolset 360 invokes visualizer 368 to generate behavioral user segmentation graph 346 that visually illustrates comparisons of a plurality of graph embeddings 344, each representative of intent within a different conversation.

Advantageously, the developer may use behavioral user segmentation graph 346 and control flow diagram 342 to better understand operation of natural language interface 100 and thereby further develop and improve natural language interface 100 for handling customer communications for the insurance company.

Real-Time Conversation Analysis and Prediction

Result analyzer 370 may invoke predictor 372 to generate predictions 352 of an outcome (e.g., whether the conversation will lead to a sale of a product) of a conversation as conversational data 320 from the conversation is received in real-time (e.g., as the conversations are happening) from natural language interface 100. Predictor 372 may, by comparing graph embeddings 344 of a current conversation with graph embeddings 344 of previous conversations, identify similar ones of the previous conversations. For example, vectors defined by the current graph embeddings may be compared to vectors of previous conversations, where vectors that have a similar direction indicate similar intent in previous conversations. By determining the outcome of these similar previous conversations, the predictor 372 may generate prediction 352 to indicate a likely outcome of the current conversation. Advantageously, result analyzer 370 and predictor 372 may be used to adjust a course of the conversation by "nudging" the user in a desired direction through responses based on prediction 352, thereby steering the conversation to desired result (e.g., sale of the product).

In one example of operation, natural language interface 100 is an initial point of communication for a mortgage brokerage. The user converses with natural language interface 100 until it is beneficial for a human sales agent to take over the conversation. To make it more likely that the user, during the conversation with natural language interface 100, accepts an offer to converse with a human sales representative, the interface controller 374 may invoke result analyzer 370 and/or predicter 372 to generate prediction 352 indicative of whether the current conversation indicates that the user is ready to converse with the human sales representative. For example, predicter 372 uses graph embedding 344 of the user's current conversation to identify other user conversations that are similar, and when the outcome of these similar conversations indicates a positive result (e.g., the result indicates that the user spoke with the human sales agent), then the interface controller 374 may instruct natural language interface 100 to ask whether the user would like to talk with the human sales agent. However, where the results of similar conversations are not positive (e.g., do not indicate that users of similar conversations wanted to talk with a human sales agent), interface controller 374 may direct the natural language interface 100 to continue the conversations with the user, asking more specific questions of the user, for example. Interface controller 374 may determine the likelihood of the user accepting the offer to talk with the human sales representative early in a conversation, and thereby direct natural language interface 100 to ask certain questions that may steer the conversation towards the current goal (e.g., of accepting the offer to talk with the human sales agent).

Particularly, interface controller 374, based upon prediction 352, may change behavior of DM component 104 and/or NLG component 106 of three-component stack 101 to steer a current conversation towards the desired result. In one embodiment, interface controller 374 generates interface controls 354 based, at least in part, upon graph embeddings 344 of control flow diagrams 342, and prediction 352. Interface controller 374 sends interface controls 354, via interface 303, to DM component 104 and/or NLG component 106 of natural language interface 100.

Advantageously, result analyzer 370 and predicter 372 may be used with machine learning algorithms to improve performance (e.g., learn), over time, of DM component 104 to improve outcome of conversations handled by natural language interface 100.

Conversational analytics toolset 360 may also include an artificial conversation generator 376 that may be invoked to generate an artificial conversation 356 based upon one or more control flow diagrams 342 of previous conversations. Artificial conversation generator 376 may process control flow diagram 342 and generate a new sequence of intents, which may include new intents, that may not have been previously observed. Based upon this new sequence of intents, artificial conversation generator 376 may generate artificial conversation 356 using corresponding user utterances from the previous conversations. In certain embodiments, user interface 361 may allow the designer to interact with artificial conversation generator 376 to ensure that artificial conversation 356 makes sense. Accordingly, toolset 360 facilitates generation of artificial conversation 356 that may be used to further develop natural language interface 100.

Figure 8:
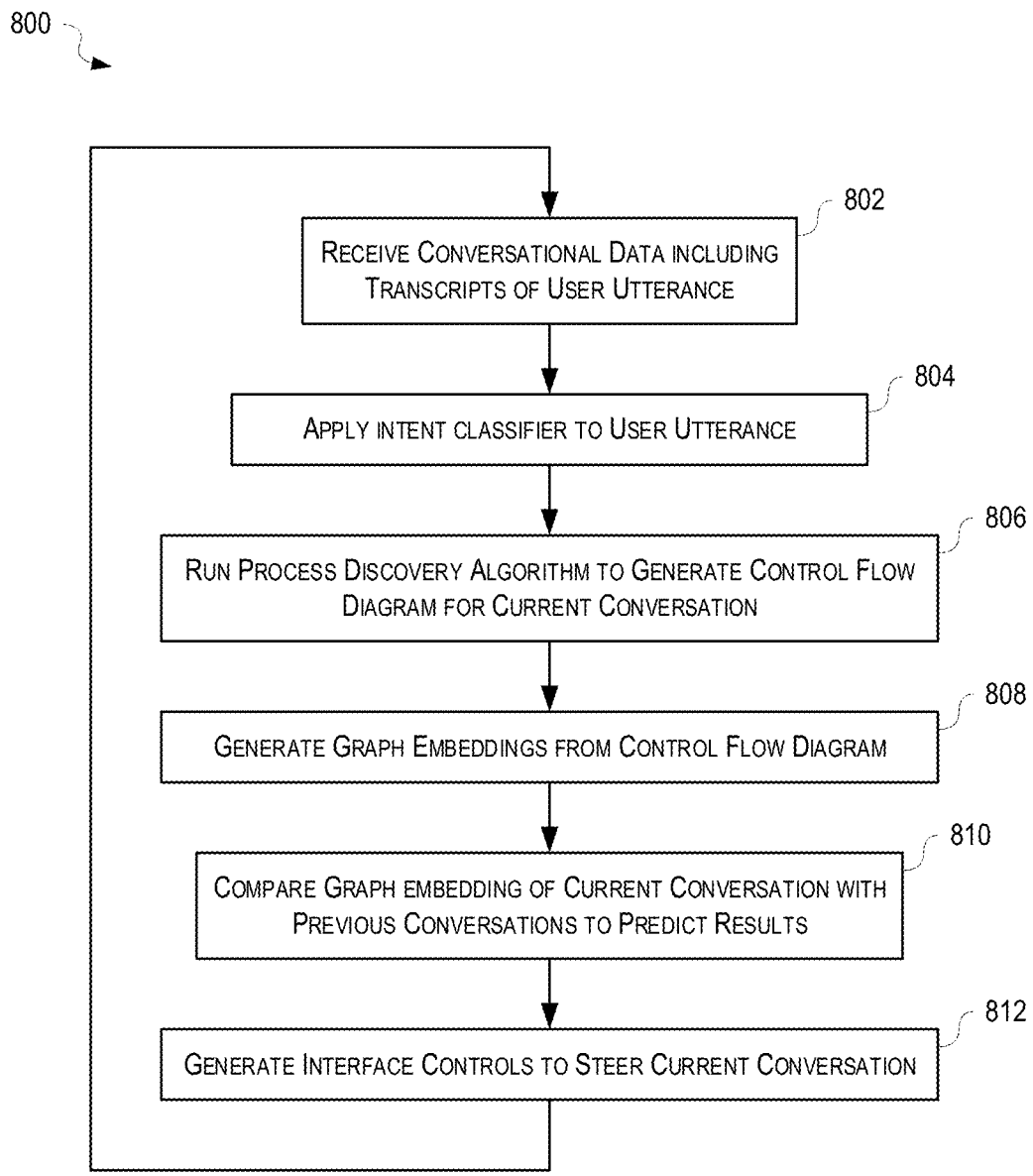
FIG. 8 is a flowchart illustrating one example method for real-time analysis of conversations, in an embodiment.

FIG. 8 is a flowchart illustrating one example method 800 for real-time analysis of a conversation. Method 800 may be implemented in result analyzer 370 of toolset 360 running on natural language analyzer 300 of FIG. 3. Where natural language interface 100 implements a first point of contact for customers of an insurance company, method 800 may be used to improve an outcome of a conversation of a customer with natural language interface 100 by steering that conversation towards a more positive result.

In block 802, method 800 receives conversational data including a transcript of a user's utterance. In one example of block 802, toolset 360 receive conversational data 200, including utterance 206, via interface 303 from natural language interface 100. In block 804, method 800 applies an intent classifier to the user utterance. In one example of block 804, toolset 360 invokes intent classifier 362 to process utterance 206 received in block 802 and to generate a corresponding intent 330. In certain embodiments, block 804 may be omitted when intent classification is performed by an external process (e.g., as part of natural language interface 100). In block 806, method 800 runs a process discovery algorithm to generate a control flow diagram for the current conversation. In one example of block 806, toolset 360 invokes process discovery algorithm 364 to generate control flow diagram 342 for the conversation that includes utterance 206 received in block 802 and intent 330 generated in block 804. In block 808, method 800 generates graph embeddings from the control flow diagram. In one example of block 808, toolset 360 invokes graph embedder 366 to generate graph embeddings 344 from control flow diagram 342 generated in block 806.

In block 810, method 800 compares the graph embeddings for the current conversation with graph embeddings of previous conversations to predict results. In one example of block 810, toolset 360 invokes result analyzer 370 and predicter 372 to generate prediction 352 based, at least in part, upon conversational result graph 350, result data 348, and graph embeddings 344 of the current conversation. In block 812, method 800 generates interface controls to steer the current conversation. In one example of block 812, toolset 360 invokes interface controller 374 to generate interface controls 354 based, at least in part, upon one or more of control flow diagram 342, graph embeddings 344, and prediction 352, and to send interface controls 354, via interface 303, to DM component 104 and/or NLG component 106 of natural language interface 100. Advantageously, use of method 800 steers the conversation between the customer and natural language interface 100 towards a more positive outcome, such as where the customer buys an insurance policy from the company for example.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A natural language interface development method, comprising:
   receiving, from a natural language interface and for a plurality of conversations, conversational data including user utterances;
   classifying each of the conversations to determine one or more intents for each of the user utterances;
   generating, for each of the conversations, a control flow diagram showing the intents and sequential flow of the conversation;
   processing each of the control flow diagrams to generate a graph embedding representative of the conversation;
   receiving, from the natural language interface, current conversational data including current user utterances of a current conversation;
   classifying the current conversation to determine current intents for each of the current user utterances;
   generating a current control flow diagram based upon the current intents;

processing the current control flow diagram to generate a current graph embedding;

selecting at least one previous graph embedding of a previous conversation nearest to the current graph embedding;

determining a previous outcome of the previous conversation; and generating a predicted outcome of the current conversation based upon the previous outcome.

2. The natural language interface development method of claim 1, further comprising displaying at least one of the control flow diagrams to a designer of the natural language interface.

3. The natural language interface development method of claim 1, further comprising:

generating a behavioral user segmentation graph, based upon the graph embeddings, where each of the conversations is represented as a dot;

displaying the behavioral user segmentation graph to a designer of the natural language interface; and wherein spatial proximity of the dots within the behavioral user segmentation graph indicates similarity of intent in the conversations.

4. The natural language interface development method of claim 1, the step of selecting comprising comparing a current multi-dimensional vector of the current graph embedding with a previous multi-dimensional vector of the at least one previous graph embedding.

5. The natural language interface development method of claim 1, further comprising steering response outputs of the natural language interface for the current conversation based upon the predicted outcome, when the predicted outcome is not positive.

6. A method for directing a current conversation with a natural language interface, comprising:

receiving a most recent utterance from a user in the current conversation;

classifying the most recent utterance to determine an intent of the user;

generating a current control flow diagram of the current conversation;

generating a current graph embedding for the current control flow diagram;

selecting at least one previous graph embedding nearest to the current graph embedding, wherein the at least one previous graph embedding corresponds to at least one previous conversation;

determining a previous outcome of the at least one previous conversation;

generating a predicted outcome of the current conversation based upon the previous outcome; and steering response outputs of the natural language interface for the current conversation based upon the predicted outcome, when the predicted outcome is not positive.

7. The method of claim 6, further comprising generating interface controls to control the natural language interface to generate a response to steer the current conversation towards a desired result based upon the predicted outcome.

8. A software product comprising instructions, stored on computer-readable media, wherein the instructions, when executed by a computer, perform steps for natural language interface development, comprising:

instructions for receiving, from a natural language interface and for a plurality of conversations, conversational data including user utterances;

instructions for classifying each of the conversations to determine intents for each of the user utterances;

instructions for generating, for each of the conversations, a control flow diagram showing the intents and sequential flow of the conversation;

instructions for processing each of the control flow diagrams to generate a graph embedding representative of the conversation;

instructions for receiving, from the natural language interface, current conversational data including current user utterances of a current conversation;

instructions for classifying the current conversation to determine current intents for each of the current user utterances;

instructions for generating a current control flow diagram based upon the current intents;

instructions for processing the current control flow diagram to generate a current graph embedding;

instructions for selecting at least one previous graph embedding of a previous conversation nearest to the current graph embedding;

instructions for determining a previous outcome of the previous conversation; and instructions for generating a predicted outcome of the current conversation based upon the previous outcome.

9. The software product of claim 8, further comprising instructions for displaying at least one of the control flow diagrams to a designer of the natural language interface.

10. The software product of claim 8, further comprising:

instructions for generating a behavioral user segmentation graph, based upon the graph embeddings, where each of the conversations is represented as a dot;

instructions for displaying the behavioral user segmentation graph to a designer of the natural language interface; and wherein spatial proximity of the dots within the behavioral user segmentation graph indicates similarity of intent in the conversations.

11. The software product of claim 8, the step of selecting comprising instructions for comparing a current multi-dimensional vector of the current graph embedding with a previous multi-dimensional vector of the at least one previous graph embedding.

12. The software product of claim 8, further comprising instructions for steering response outputs of the natural language interface for the current conversation based upon the predicted outcome, when the predicted outcome is not positive.

* * * * *